Sept. 12, 1950               A. GOETZ               2,521,713
METHOD FOR PRODUCING A MICROBICIDAL
COMPOSITION OF MATTER
Filed July 23, 1945
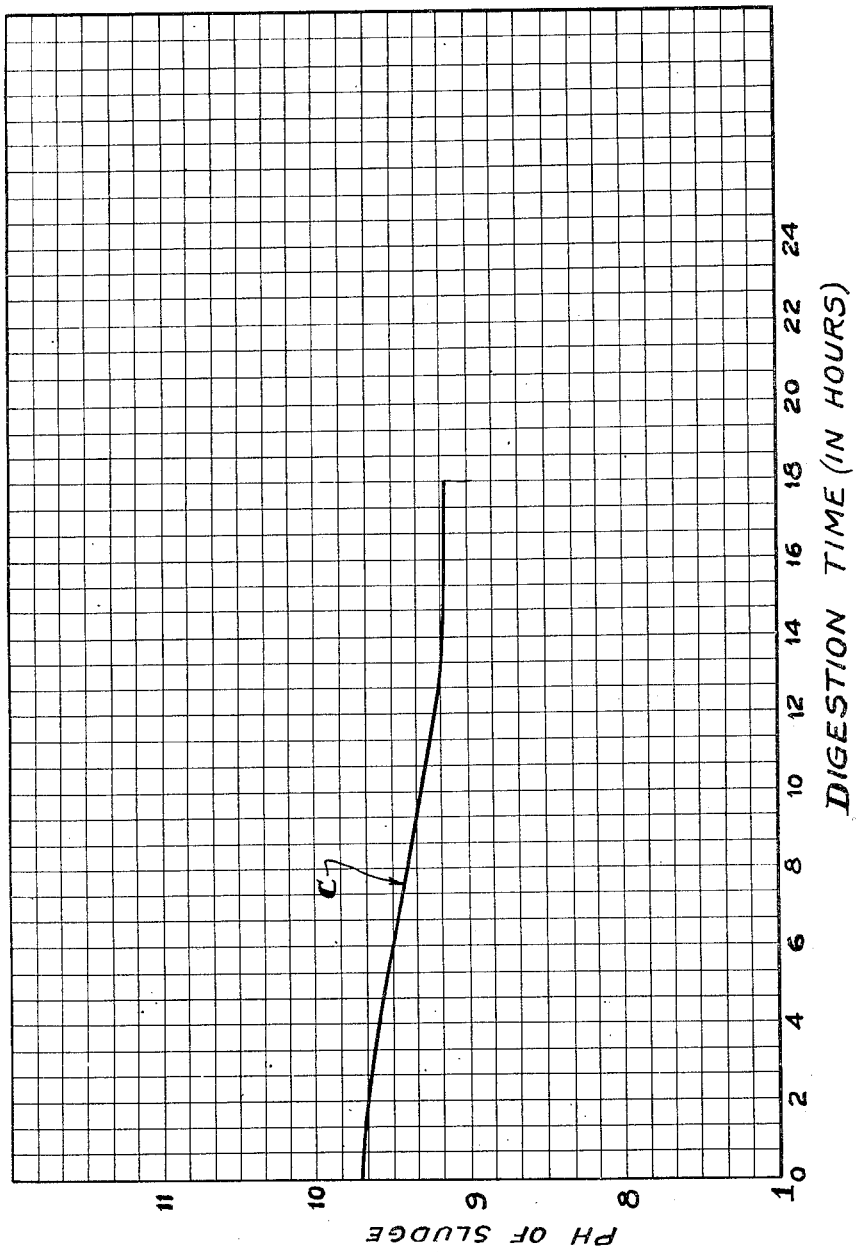
INVENTOR.
*ALEXANDER GOETZ*
BY
ATTORNEY.

Patented Sept. 12, 1950

2,521,713

UNITED STATES PATENT OFFICE 2,521,713

METHOD FOR PRODUCING A MICROBICIDAL COMPOSITION OF MATTER

Alexander Goetz, Altadena, Calif., assignor to Sunshine Mining Company, Yakima, Wash., a corporation of Washington Application July 23, 1945, Serial No. 606,565

3 Claims. (Cl. 167—14)

This invention relates to microbicidal complexes formed in part of silver oxide or silver carbonate or of any other basic silver compound. By "basic silver compound" I mean a substantially insoluble silver compound having a basic or high sludge pH, or one which in my process yields silver oxide or hydroxide as one state of the process. The term "microbicide" as used herein includes lethal or growth-inhibiting material effective against microbiota, such as bacteria, both pathogenic and non-pathogenic, such as gram positive micrococci, such as staphylococci, streptococci and pneumococci; gram negative bacilli such as *Escherichi coli* and anerobic bacilli such as *Colostridium welchii* and *Ostridium sporogedenes*, and for molds such as *Aspergillus niger* and *Penicillium notatum*.

The term "sludge pH" refers to the property of finely divided solids to exhibit a pH which may be different from the aqueous environment in which they are suspended. To measure the sludge pH, finely subdivided test material is dispersed in water and thus converted into a homogeneous sludge of high solids content by the addition of an adequate quantity of distilled water. The pH determination is performed by means of a glass electrode in the conventional manner.

For purposes of my invention I have found that of the basic silver compounds $Ag_2O$ and $Ag_2CO_3$ are especially suitable for development of complexes of superior microbicidal and catalytic properties. Therefore, what is hereafter said of $Ag_2O$ applies as well to $Ag_2CO_3$, which in my process is the practical equivalent of $Ag_2O$ and may be substituted therefor. The preferred embodiments of my invention resulting in microbicidal material of superior utility have been made from $Ag_2O$. However, I do not mean that my invention is limited to complexes of silver oxide.

I have found that by suitably combining such basic silver compounds, employed as solids, with insoluble, finely divided solid materials, especially when both are dispersed in an aqueous medium, I may produce a highly active microbicide which, in contradistinction to known stoichiometric silver compounds, such as $Ag_2O$, $AgNO_3$, $AgCl$, $Ag_2SO_4$, Ag acetate, silver lactate, silver citrate, remains highly active in the presence of inhibiting substances which impair the microbicidal activity of such silver compounds, and which, in contradistinction to the stoichiometric silver compounds, will not denature proteins, leucocytes, etc.

The microbicides of my invention, in contradistinction to known stoichiometric silver compounds, are also long-lasting in that their microbicidal activity remains at a high level for prolonged periods of exposure or upon repeated contact with infested environment. I therefore render Ag much more suitable for microbicidal purposes than in the form of the common silver compounds.

I have found that I may combine such basic silver compounds with relatively insoluble, finely divided materials, hereinafter called "substrate," which themselves have a sludge pH of either acidic, neutral, or basic character, under such conditions as to materially affect the physicochemical characteristics of the materials thus combined. While I do not wish to be bound by any theory of the reaction which occurs, the phenomena described below are evidences of some form of physico-chemical combination of the silver compound solids and the substrate solids in that the physico-chemical properties of the basic silver compound, for example, silver oxide or silver carbonate, and the substrate are profoundly affected.

While I do not mean to imply that the reactions are chemical in the true stoichiometric sense, the changes which occur in the sludge pH of the materials thus combined are direct evidence of some form of combination between the silver oxide and the substrate. The sludge pH resulting from this combination is materially modified by the time and the temperature at which the substrate and the basic silver compound are in wet contact with each other.

Further evidence of the transformation of the two components into a new complex resulting from prolonged mutual contact in an aqueous medium is presented by the existence of a uniform photochemical sensitivity developed throughout the complex formed according to my invention. This can be demonstrated by the following example.

ZnO is practically insoluble, photochemically entirely inactive and white of color. $Ag_2O$ is black and, though sensitive to light, does not change color appreciably when exposed to light. When 1% of $Ag_2O$ is combined with ZnO, according to my invention, the resulting compound is practically white before it is exposed to light. Exposure to light changes the color of this material to a brownish-blue so uniformly that even the highest microscopic resolving power reveals no black and white inhomogeneity of the exposed surface. This observation is inconsistent with any conclusion that a mere mixture of ZnO and $Ag_2O$ has been formed. If only an intimate mixture between ZnO and $Ag_2O$ had been produced, the black $Ag_2O$ would be observable under magnification in discrete particles embedded in the white mass of ZnO and no uniform discoloration would result; in fact, no discoloration at all would have been produced by the exposure to light. The photochemical reaction is, however, consistent with the conclusion that a new state of matter had been created by the process of my invention and that this state is not merely that of $Ag_2O$ and ZnO in mere admixture. It is furthermore observed that the sensitivity toward light of longer wave lengths can be controlled by the Ag concentration and the choice of the substrate. This variable reaction to light quanta of different frequency is an additional evidence of the existence of a new state of matter and not of an admixture.

This evidence, therefore, indicates an hitherto unsuspected transformation of substantially insoluble basic silver compounds of the nature set out above in the solid phase with other substantially insoluble solids in which transformation, surface reactions apparently occur.

I have therefore been able as a result of this basic discovery to profoundly modify the above basic silver compounds, to control the sludge pH of the silver-compound-substrate-complex and to control the emission of the silver and the photo-chemical response of the silver compound.

In the case of ordinary stoichiometric silver compounds, used as microbicides, for instance, as germicide, in the presence of inhibitors which either bind the silver ion in relatively non-dissociable form, or which act as reducing agents, the silver compound is inhibited in its bactericidal action, that is, its activity is diminished. Such materials includes sulfur in forms to produce silver sulfide, materials having active sulfur or mercaptan groups, and also sugars and protein-like substances, etc. Practically speaking there is no environment capable of supporting growth of microbiota which does not contain some substances which inhibit the microbicidal action produced by stoichiometric silver compounds. For this reason, since such inhibitors are always a part of a microbial environment, the activity of the silver compounds is limited unless one uses amounts sufficient to overcome such inhibitory action. The use of such large amounts is impractical and also presents the danger of toxicity. In the case of the complexes of my invention, the bactericidal activity per unit of silver is much greater than that of ordinary silver compounds. The reduction in microbicidal activity of the complex of my invention by the inhibitors previously mentioned is less than in the case of ordinary silver compounds. Therefore, both because I may use less silver to effect a certain microbicidal activity and because the inhibitors have less deactivating influences, I can attain either the same microbicidal activity with far smaller amounts of silver or a greatly increased microbicidal activity with the same amount of silver. Another consequence of this phenomenon is that an amount of silver employed in the complex of my invention will act as a microbicide over longer periods of time than the same amount used in ordinary stoichiometric silver compounds.

Since I may by proper control of the character of the complex, as described herein, control the emission of the silver into the aqueous environment, I may, as a consequence of the above property of my complex, limit the appearance of silver in the environment to that below any toxic level. The complexes formed according to my invention do not cause denaturation of proteins present in infested environments occurring in nature where these microbicides are employed to control or destroy microbiotic growth. The physiological danger of argyria or argyrosis present in the use of ordinary silver compounds is therefore substantially and practically removed when employing the complexes of my invention.

The fact that I have been able as a result of the formation of the above complexes to largely activate the microbicidal activity of the silver compound while reducing the solubility of the silver compound and eliminating the denaturation of protein matter is one of the advantages of my complexes as compared to ordinary compounds when used in chemo-therapy.

The microbicidal activity of my complexes does not appear dependent on the liberation of a high concentration of Ag ions in the aqueous environment. These complexes are apparently surface active materials acting through the medium of the surface of the complex.

The silver compound substrate complex of my invention in addition to acting as a microbicide also acts as a peroxide or perhydrate decomposition catalyst. Whereas the substrate may be catalytically inert in such a reaction, the complex has a catalytic activity manyfold greater, than either the substrate or the silver compound specified above when acting alone or in simple mixture. Not only is the activity of the silver compound so greatly amplified but the active life of the catalyst complex is longer.

I have found that my catalyst is particularly active in the sterilization of aqueous liquids through or by the aid of oxygen-yielding substances such as hydrogen peroxide or hydrogen peroxide complexes or of compounds which, on decomposition in the presence of water, yield some hydrogen peroxide as one stage of the process.

I have discovered that such catalysts acting upon or through the agency of such oxygen-yielding substances are microbicidal in that they will kill microbiota present so completely as to sterilize heavily infected waters, fruit juices, or other aqueous foods and liquids in a short time without the necessity of producing an Ag-ion concentration in the liquid which is physiologically objectionable.

In preparing the complexes of my invention, I disperse a suitable silver compound in powder form together with a finely divided substrate in water, preferably distilled water. The sludge pH of silver oxide varies from 9 to 10. I employ as substrate finely divided solids substantially water insoluble, the sludge pH of which is substantially basic, i. e., of sludge pH above about 7.4. Basic substrates include zinc oxide (ZnO), the sludge pH of which varies from about 7.4 to about 7.7; alumina ($Al_2O_3$) or hydrated alumina ($Al(OH)_3$), both having a sludge pH of about 10; MgO which has a sludge pH of about 9.7;

bismuth trioxide ($Bi_2O_3$) which has a sludge pH of about 9.6.

The sludge pH of these solids is apparently affected to some degree by surface contamination, particle size, and particle size distribution, and it will be found that for different samples the sludge pH varies somewhat. Therefore, in classifying the solids as basic, where their sludge pH approaches the limits given in the above classification, their sludge pH may on measurement appear to classify them differently from that stated above.

I may also employ mixtures of these substrates to form complexes with the silver compound in which the substrate is formed of a mixture of two or more different substrates of similar or dissimilar sludge pH.

I disperse the substrate in sufficient water to give a solids concentration sufficient to produce a thick or viscous mass but sufficiently fluid to be adequately mixed by stirring and then add the silver compound, stirring vigorously. The basic silver compound is added in sufficient amount to leave undissolved solids of silver compound.

In employing such silver compound, for example, $Ag_2O$ or $Ag_2CO_3$, I prefer to employ a relatively pure powder of such material. While it is possible to generate the $Ag_2O$ or $Ag_2CO_3$ or other basic silver compound in situ in the mixture of substrate and water, for example, in the case of $Ag_2O$, by reacting a soluble silver salt with an alkali, it will then be necessary to wash the complex to remove soluble electrolytes produced by the reaction. Such electrolytes introduce complications and difficulties both in forming of the complex and in the washing of the complex. These are avoided by using a previously prepared and purified basic silver compound.

The mixture is then milled in a colloid mill. An intimate mixture or dispersion in water of the solids is thus formed. The mass may then be dried and granulated or pilled or pelleted. In order to aid in the dispersion of the substrate and/or the silver compound, I may add a dispersing agent to the water. This dispersing agent has the property of deflocculating the substrate and/or the silver compound and reducing the viscosity of the mix, thus permitting the use of less water in making the mixture, i. e., by increasing the permissible solids concentration of the mix. This reduces the amount of drying that is necessary. Prior to drying I may, by subjecting the milled sludge to digestion for a controlled period of time and controlled temperature, cause the interaction between the solids to occur in the manner described above and more fully set out below. The sludge is digested for a period of time at a temperature of below about 100° C., preferably at a temperature of 50–55° C. in a closed vessel, during which digestion the pH of the sludge drops. When the desired pH is obtained the sludge is then dried.

The following examples are herewith given as an aid to the understanding of my invention and as an illustration thereof, but are not intended as any limitation thereof. This invention will also be further described in connection with the charts forming part of this specification, in which Fig. 1 shows the variation of sludge pH of the complex formed in accordance with Example 1 when digested for different periods.

*Example 1*

72 parts by weight of ZnO are dispersed in 160 parts by weight distilled water and homogenized by vigorous stirring. ZnO is finely divided, having an average particle size of about 0.3 microns or finer ranging in size to a fineness equal to lampblack, which can be obtained with average particle size of as low as 10 millimicrons. I find that the sludge pH of ZnO differs somewhat between different batches from about 7.4 to 7.7. I may employ a dispersing agent to assist in the dispersion of the ZnO. The sludge thus formed is quite viscous. Subsequently, 3 parts by weight $Ag_2O$ are added and homogenization continued. The material is then colloid milled, circulating the sludge until it becomes fluid and thoroughly dispersed. The sludge pH at the end of this process is 9.7. The behavior of the sludge pH after prolonged digestion at 50°–55° C. undergoes but a minor fall in value. The sludge pH of this complex decreases only a little (to 9.1 after 18 hours), as illustrated in curve A, Fig. 1. By interrupting the digestion at an intermediate point and drying, I may obtain a complex ranging in pH from about 9 to 9.75.

*Example 2*

Instead of using ZnO as in Example 1, I may use an insoluble basic metal oxide or hydroxide, such as aluminum hydroxide (i. e. hydrated alumina ($Al(OH)_3$) or alumina ($Al_2O_3$). The sludge pH of the $Al(OH)_3$ used was 10.07 and of the $Al_2O_3$ was 9.88. The process of Example 1 was followed using a ratio by weight of $Ag_2O$ to $Al_2O_3$ or hydrated alumina $Al(OH)_3$ of 4.8 parts of $Ag_2O$ to 95.2 of the $Al_2O_3$ or $Al(OH)_3$. The sludge pH after mixing and colloid milling was about 10.4 in the case of the $Al_2O_3$ and 10.8 in the case of the $Al(OH)_3$. After 44 hours of digestion the sludge pH of the mixture containing $Al_2O_3$ was about 10.5 and that containing $Al(OH)_3$ about 10.2. The sludge was then dried as described for the other example. The ratio of $Al_2O_3$ or $Al(OH)_3$ may be varied to give various concentrations of $Ag_2O$.

While in the specific examples I have illustrated one ratio of $Ag_2O$ to the substrate, I may vary the $Ag_2O$ to substrate ratio in any desired proportion. Thus, I may vary the $Ag_2O$ from less than a fraction of 1% in the order of varying from a trace up to equal quantities with the substrate or an even higher proportion. The amount which may be incorporated depends on the substrate and the use to which the complex is to be put. The upper limit is the amount of $Ag_2O$ which will combine with the substrate to give the pH differences herein described. This value may be termed the saturation value. If this value is exceeded, the complex will have an excess of silver and show the sludge pH of $Ag_2O$.

In Fig. 1 is plotted the effect of digestion time on the sludge pH of the sludge formed according to Example 1. As indicated above, curve A represents the variation of the pH of the sludge as it is digested. The sludge pH of $Ag_2O$ is about 9.3 and the sludge pH of the ZnO employed in Example 1 is about 7.4 to 7.7. On colloid milling the sludge pH of the admixture is 9.75. The sludge pH is actually higher than that of the $Ag_2O$. As digestion is prolonged, the sludge pH drops. The same phenomenon is observed in connection with the basic substrates $Al_2O_3$ and $Al(OH)_3$. In the case of these substrates which show higher sludge pH than the $Ag_2O$, the sludge pH on colloid milling is higher than that of the $Ag_2O$ and also higher than that of the substrates. On digestion the sludge pH shows a gradual drop, as in the case of the complex formed from the ZnO substrate, from the high value attained on colloid milling. However, in the case of the highly basic substrates Al₂O₃ and Al(OH)₃, the sludge pH did not drop, in Example 2, to the sludge pH of the Ag₂O. By proper choice of substrates, as exemplified above, I can thus increase the sludge pH of both substrate and basic silver compound by combining them in the form of the complex of my invention.

It will be observed from the curve, Fig. 1, that as the digestion process continues the sludge pH of the complex drops. Thus, in Example 1, Fig. 1, should the digestion have continued for several more hours, the sludge pH would have dropped further, but the rate at which the sludge pH dropped, with continuation of the digestion, decreased. The curve tends to flatten out. This same phenomenon occurs in the case of ZnO of Example 1, in which it appears that the sludge pH flattens out in the region of about 9 to 9.5. The level of sludge pH at which this levelling out occurs depends on the amount of Ag₂O combined with the substrate in the complex, ranging from a trace or less than 1% of Ag₂O up to the saturation value of the substrate.

The sludge pH after an initial period of slow change, which may be called an induction period for this reason, enters a region during which the reaction accelerates and there is a relatively rapid variation of sludge pH with digestion. This may be termed the region of vigorous reaction. The rate of drop of pH then falls off markedly. The curve flattens out and is of markedly smaller slope than in the region of vigorous reaction. The transformations are nearing completion, i. e., approaching or at equilibrium or quasi-equilibrium.

In carrying out my digestion to obtain stable microbicidal materials, I prefer to continue my digestion until the digestion approaches equilibrium, that is, arrives in the flat region of the curves of pH vs. time. I term this region the region of equilibrium, remembering that this will include a state of quasi-equilibrium where the rates of change of pH are materially slowed down as previously described.

It is to be recognized, however, that a complex at equilibrium due to digestion at one temperature may not be at equilibrium at another temperature, and I may arrive at further equilibrium at lower pH values by raising the temperature of digestion.

I can therefore by choice of substrate and the degree and temperature of digestion attain the desired sludge pH of the complex.

Thus, as is illustrated by Example 2, by choosing a substrate having a sludge pH higher than the basic silver compound such as, for example, Ag₂O, the final sludge pH may be made higher than that of the silver compound and even higher than the sludge pH of the original substrate. By employing a basic substrate having a sludge pH lower than that of the basic silver compound, I may by such choice of substrate and the time and temperature of digestion obtain a complex the sludge pH of which may be intermediate the sludge pH of silver compound and the original substrate when separately measured, or higher than the sludge pH of the substrate.

Although I do not wish to be bound to any physico-chemical theory of the mechanism of my process, I believe that the foregoing facts are consistent with the view that reactions occur between the solid particles employed in my process and that the resultant complex is not a mere admixture of the components thereof.

Since the effects produced apparently do not follow a simple stoichiometric law in that the components do not enter into reaction according to their combining weights, it is concluded that the complexes formed are not true compounds in a chemical sense.

That some form of physico-chemical alteration of the silver oxide occurs is further supported by the profound alteration in the emission of silver from the silver complex when compared with the solubility of silver oxide.

The emission of silver into the aqueous environment does not follow a simple solubility law as in the case of stoichiometric silver compounds. The amount of silver in the aqueous environment depends upon the amount of material employed. Thus, as was stated above, Ag₂O will saturate a distilled water solution at 13,000 gammas per liter, expressed as Ag, and a half normal KNO₃ solution at 90,000 gammas per liter, expressed as Ag. The total silver which will be found in distilled water solutions prepared with the complexes of my invention, depending upon the complex and the ratio of complex to aqueous medium, may be equal to or more or less than these saturation values, even though I use complexes carrying combined Ag which, when expressed as the basic silver compound of said complex, e. g., Ag₂O, is in excess of such saturation values.

The emission of silver may be altered by varying the character of the substrate and/or the sludge pH of the substrate. In the following examples the emission of silver into 100 cc. of boiled distilled water from an amount of complex equivalent to 25 milligrams Ag₂O may be increased up to more than 3.5 times the solubility of the silver oxide to 47,000 gammas of Ag per liter. This range may be made even more extensive by proper choice of the substrate and/or adjustment of the pH and by the extent of digestion.

In the case of the substantially alkaline substrates, such as zinc oxide, the complexes of high sludge pH show less silver emission than the low sludge pH complexes, varying from about 40,000 to 50,000 gammas Ag per liter at a sludge pH of about 8.7 to about 12 to 15,000 gammas of Ag per liter at a sludge pH of about 9.8.

The emission of silver, like the solubility of Ag₂O, depends on the ionic strength of the aqueous environment, even in the absence of common ion effect or base exchange. In the presence of electrolytes, such as 0.5 normal KNO₃ solution, this solubility or emission is amplified. The emission or concentration of silver in that case also depends on the amount of material employed and may reach a saturation value depending on the amount of Ag₂O in the complex. With zinc oxide complexes containing Ag equivalent to 1%, calculated as Ag₂O, a saturation is not reached at 92,000 gammas of Ag per liter of .5N KNO₃ solution, even though I employ enough complex to give 1,000,000 gammas of silver per liter, i. e., 100,000 milligrams of complex carrying silver equivalent to 1,000 milligrams of Ag₂O. With higher concentration of Ag₂O (for example, 10% Ag₂O and 90% ZnO) in the complex saturation is not reached even employing 100,000 milligrams of powder carrying 10,000,000 gammas of Ag₂O. In that case I may introduce 121,000 gammas of Ag per liter into the KNO₃ solution. By controlling the concentration Ag₂O in the complex, I may control the emission of Ag₂O into the electrolyte solution.

The ability to control the amount of silver which may be introduced into an aqueous medium by means of the complexes of my invention, and to yield concentrations of silver over wide limits, is of importance where it is desired to control the silver concentration in aqueous media. Many processes of liquid sterilization heretofore proposed depend on the concentration of dissolved silver in such media. In the case of my microbicides, however, the microbicidal effect does not depend on the concentration of dissolved silver. In fact, the microbicidal activity appears to be greater than when using ordinary silver salts, such as silver nitrate, which give concentrations of silver ions manyfold greater than that obtainable from the complexes of my invention. The microbicidal activity is accompanied, in the case of the complexes of my invention, by substantial and even total absence of protein denaturation. This is in substantial contradistinction to the case of the ordinary silver salts which act through the properties of the Ag ion. In such cases the microbicidal activity is accompanied by extensive denaturation of the protein environment. I have found that the microbicides of my invention are active without such denaturation when they yield silver concentrations much greater than that obtained when using silver oxide.

To illustrate this property of my complexes, the following experiments, charted in Fig. 5, may be taken as typical:

Three sets of Petri dishes were prepared: set I, with nutrient agar; set II, with nutrient agar employing .02% cystine; and set III, nutrient agar with .01% sodium thioglycolate. Cystine and sodium thioglycolate are well known inhibitors for the microbicidal activity of silver, due to the sulfur complex present in both compounds as shown in HSCH₂COONa (thioglycolate); (SCH₂CH(NH₂)COOH)₂ (cystine). On each of the plates, the following materials were placed: AgNO₃ (silver nitrate), Ag₂SO₄ (silver sulfate), CH₃CHOHCOOAg (silver lactate),

$CH_3(CH_2)_7 CH=CH (CH_2)_7 COOAg$ (silver oleate), Ag₂O (silver oxide).

Complex 1 was formed according to Example 1, using ZnO as substrate, an Ag₂O concentration of 1%, and digested to yield a sludge pH of 9.27.

In order to obtain comparable performance and results of the above five stoichiometric silver compounds and the ZnO complex, the following technique was employed:

Equal weights of each of the different materials were dispersed in equal weights (1:1) of an aqueous solution containing 1% nutrient agar. These suspensions were allowed to harden; each hardened suspension then represented a gelatinous mass out of which cylindrical pellets of equal diameter, about 3 millimeters, and height (3 millimeters), were cut with an adequate tool. One representative of each of the above materials was placed on the nutrient agar layer of each of the above three types of nutrient, so that each pellet was in wetting contact with the nutrient agar. Each of these plates was then inoculated with a mixture of *E. coli*, staphylococcus and streptococcus and incubated for 48 hours. The plates showed a heavy growth of bacteria colonies except for a clear sterile zone or annulus around each of the pellets and spots. The width of the sterile annulus was measured.

In addition to the sterile zone, a zone of discolored nutrient, in general opaque, could be observed whenever the silver-bearing material contained in the pellet has the tendency to denature the protein contained in the nutrient of the agar plate. It is thus possible to observe and compare quantitatively in one and the same experiment the microbicidal action as well as the denaturing effect of each pellet and to compare their action numerically by the diameters of the sterile and denatured annuli.

The following table gives the width of the sterile annulus and the width of the annulus of the denatured zone surrounding the pellets:

*Width of sterile annulus and annulus of denaturation in millimeters*

|  | Petri Dish I | | Petri Dish II | | Petri Dish III | |
|---|---|---|---|---|---|---|
|  | Sterile Zone | Denat. Zone | Sterile Zone | Denat. Zone | Sterile Zone | Denat. Zone |
| Silver nitrate | 3 | 3 | .5 | 2 | 1 | 2 |
| Silver sulfate | 2 | 2 | .5 | .5 | 1 | 1 |
| Silver lactate | 1.5 | 2 | .5 | 1.5 | 1 | 2 |
| Silver oleate | 2 | 2 | .25 | 2 | .5 | 2.5 |
| Silver oxide | 4 | 1.5 | 2 | 1 | 1.5 | 2 |
| Complex 1 | 3 | none | 1.5 | none | 2 | none |

It is evident from this table that all stoichiometric silver salts, regardless of their solubility, produce denatured zones which are of the same order of magnitude as the sterile zones, and which former can exceed in many cases the latter, especially in the presence of inhibitory agents. In contradistinction to this behavior, the substances characterized by my invention not only show a lesser degree of a relative inhibition by addition agents such as sodium thioglycolate, etc., but also show no measurable width of a denaturation zone.

It will be observed that when employing the stoichiometric silver compounds there was present at the zone of contact between the pellet and the nutrient agar surface in the dish a silver concentration many times greater than when employing the complexes of my invention, yet the microbicidal activity of my complexes was as great or greater than in the case of the stoichiometric silver compounds. Thus, compare Complex 1 in Petri dish I with the stoichiometric silver compounds in the same Petri dish. Additionally, the complexes of my invention are more resistant to commonly occurring inhibitors. Except for Ag₂O, the sterile ring of the complex in the case of Petri dish II, is greater than that for the other silver compounds. However, in the case of the thioglycolate, the sterile ring is as great or greater than in the case of Ag₂O which shows the widest ring of all the stoichiometric silver compounds.

The behavior described above illustrates the peculiar properties of the complexes of my invention. They are more active than simple silver compounds, since when employed in low dilution they are as active or more active than silver compounds carrying a higher concentration of silver. Therefore, for the same unit of silver exposed to the microbial environment, I can obtain a greater microbicidal activity in the case of my complexes than can be obtained with simple stoichiometric silver compounds, or I can obtain the same microbicidal activity with less silver. These complexes are also more resistant to inhibitors. The deactivating influence of inhibition is less in the case of the microbicides of my invention than in the case of the simple stoichiometric silver compounds, so that less of the silver need be employed to overcome this deactivation. Particularly important is the fact that this microbicidal activity is accompanied by substantially no denaturation of the protein environment. In this regard the silver complexes of my invention are uniquely different from stoichiometric silver compounds. In all such cases of denaturation, I believe the action is through the activity of the Ag ion, and since this microbicidal activity of the stoichiometric silver compounds depends on Ag ions, the silver ions combine with the protein to denature it. This is evidenced by the coloring of the protein and is present whether observed in the Petri dish or in the discoloration of skin, nails or other tissue or mucosa.

The complexes formed according to the above methods find wide application in pharmaceutic and medical arts. They may be used as germicides in treatment of skin wounds, abrasions or burns, or as therapeutic agents in the treatment of diseases of the skin, such as boils, pimples, ringworm, or trichophytosis ("athlete's foot"). In all such cases the complex may be applied as a paste in water, and after application may be washed off.

The complexes of my invention may also be employed to produce self-sterilizing surfaces on glass, wood, metal, paper, cellophane, etc. The dried complex is dispersed as a pigment in a plastic binder having a desirable water permeability and water capacity. Thus, I may employ the alkyd resins of low acid number, co-polymers of the vinyl esters, either alone or in admixture with vinyl-butyral resin. I may use the methyl-acrylate resins, or cellulose esters or ethylcellulose resins. All these resins have the desirable water permeability and capacity. The complex is dispersed in the plastic binder in suitable diluent or solvent and the surface to be treated is coated by painting, dipping, spraying, or by means of printing rollers, where sheets or other printable surfaces are to be coated with such material. Microbiota in contact with such surfaces are destroyed.

The microbicidal activity of the complexes of my invention may also be used in treatment of surfaces of textiles, papers and plastic sheet material.

In employing the complexes of my invention as catalysts and microbicides for the sterilization of water, the contaminated water, which may have been previously filtered to remove dirt, solid matter, cysts and such other relatively large organisms removable by ordinary filtration, is contacted with my material in the presence of a peroxide or a peroxide yielding substance.

I may employ inorganic peroxides, such as $H_2O_2$, $Na_2O_2$, or other alkali peroxides, $CaO_2$, $MgO_2$, and other inorganic derivatives of $H_2O_2$. Instead of using inorganic peroxides I may employ organic peroxides, employing the term to include perhydrates in which the $H_2O_2$ is an additive compound or complex with the organic compound rather than one in which the oxygens are linked to the carbon in a typical peroxide formulation, i. e., R—C—O—O—C—R. In this respect the term "peroxide," while employed loosely for such compounds as urea peroxide, is not strictly scientific and may be considered as a coined word for the purposes of this specification to include hydrogen peroxide and other inorganic peroxide derivatives of $H_2O_2$ and perhydrates both inorganic and organic, being complexes of $H_2O_2$ and other inorganic or organic compounds, for example, carbamide perhydrate, also known commercially as urea peroxide, the formula for which is $CO(NH_2)_2.H_2O_2$ or $CO(NH_2)_2.XH_2O_2$, $CaO_2$ and $MgO_2$.

I may for some uses employ alkali metal peroxides such as sodium or potassium peroxide, particularly where the alkali ion concentration at the end of sterilization is not too high for potability, or where the sterile water is used for purposes other than drinking water.

The water may be treated by adding the peroxide or perhydrate to the water phase separately and then mixing the same with the catalytic microbicidal complex of my invention in powder form. I add to such water the peroxide or perhydrate, as soluble peroxide or perhydrate, for example, urea peroxide. The urea peroxide may, however, be mixed with the complex and the infested water mixed with the powder and after standing for a short period it may be filtered. The water will be found to be potable and sanitary according to the most rigid health standards.

Instead of employing a contact method of sterilization as previously described, the water may be sterilized by passing the same through a filter medium or porous body containing my microbicidal catalyst. The contaminated water, preferably after prior filtration to remove suspended bodies and organisms such as cysts which are removable by ordinary filtration, is passed through a filter medium composed of or carrying the aforementioned microbicide and catalyst. If desired, water may be charged with the peroxide in soluble form such as the soluble peroxide previously referred to, for example, hydrogen peroxide, or urea peroxide, or any of the other soluble peroxides previously referred to.

I prefer to employ a relatively insoluble peroxide, for example, calcium peroxide or magnesium peroxide. This peroxide is mixed with powdered complex. The mixed powder is suspended in the plastic binders previously referred to and a filter medium is coated therewith. For example, canvas or porcelain or sand or diatomaceous earth filter medium may be coated or impregnated with this material. The filter may be used to purify water which is passed therethrough.

While I have described a particular embodiment of my invention for the purpose of illustration, it should be understood that various modifications and adaptations thereof may be made within the spirit of the invention as set forth in the appended claims.

I claim:

1. A process for the production of a microbicidal composition of matter, comprising mixing a water sludge of a solid finely divided basic silver compound and finely divided zinc oxide, digesting said mixture in the presence of water for a period of time sufficient to reduce the sludge pH of said mixture to approximately 9.

2. A process for the production of a microbicidal composition of matter, comprising mixing a water sludge of a solid finely divided oxide of silver and finely divided zinc oxide, and digesting said mixture in the presence of water for a period of time sufficient to reduce the sludge pH of said mixture to about the equilibrium sludge pH of said composition.

3. A process for the production of a microbicidal composition of matter, comprising mixing a water sludge of a solid finely divided oxide of silver and finely divided zinc oxide, and digesting said mixture in the presence of water for a period of time sufficient to reduce the sludge pH of said mixture to about 9.

ALEXANDER GOETZ.

REFERENCES CITED

The following references are of record in the file of this patent:

UNITED STATES PATENTS

| Number | Name | Date |
|---|---|---|
| 2,008,131 | Dieck | July 16, 1935 |
| 2,038,694 | Wiggins | Apr. 28, 1936 |
| 2,040,806 | Feigl | May 12, 1936 |
| 2,192,285 | Feigl | Mar. 5, 1940 |
| 2,194,602 | Law et al. | Mar. 26, 1940 |
| 2,225,867 | Hurd | Dec. 24, 1940 |

FOREIGN PATENTS

| Number | Country | Date |
|---|---|---|
| 29,049 | Great Britain | 1912 |
| 306,547 | Great Britain | May 20, 1930 |